Patented Sept. 5, 1922.

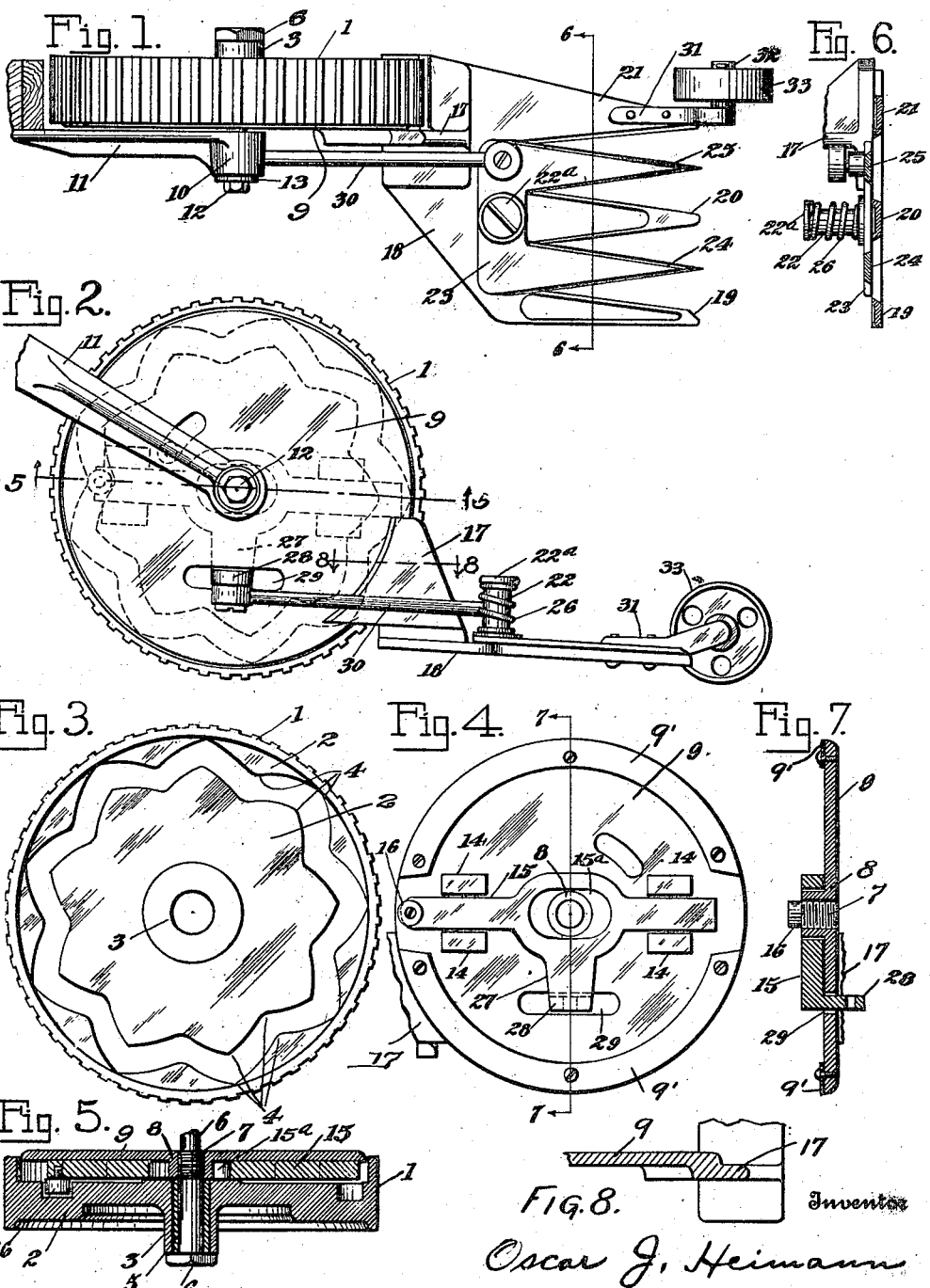

1,428,284

UNITED STATES PATENT OFFICE.

OSCAR J. HEIMANN, OF URBANA, OHIO.

GRASS CUTTER.

Application filed September 2, 1921. Serial No. 497,823.

*To all whom it may concern:*

Be it known that I, OSCAR J. HEIMANN, a citizen of the United States, residing at Urbana, in the county of Champaign and State of Ohio, have invented certain new and useful Improvements in Grass Cutters, of which the following is a specification.

This invention relates to improvements in machines for cutting grass, it particularly relating to a machine of this character especially designed for trimming grass about the edges of lawns, in fence corners, or in fact, any place not accessible to the ordinary lawn mower.

An object of my invention is to provide a machine for the purpose referred to which will be simple and compact in character, economical in manufacture and effective for the purpose for which it is designed. Further and more specific objects will be apparent from the accompanying description and claims.

Referring to the drawings:—

Fig. 1 is a top plan view of a machine embodying the improvements.

Fig. 2 is a side elevation of the same.

Fig. 3 is an elevation of the inner side of the ground wheel.

Fig. 4 is an elevation of the inner side of the supporting member for the cutters and their operating devices.

Fig. 5 is a section on the line 5—5 of Fig. 2.

Fig. 6 is a section on the line 6—6 of Fig. 1.

Fig. 7 is a section on the line 7—7 of Fig. 4.

Fig. 8 is a section on the line 8—8 of Fig. 2.

Referring to the drawings, 1 represents the rim of a ground or carrying wheel, the outer periphery of which is preferably provided with cleats as shown; 2 is the web of the wheel and 3 the hub thereof, the web being formed to completely close one side of the wheel. The web of the wheel near the inner periphery of the rim is formed with a circumferentially extending cam-way which has a plurality of equally-spaced cam projections 4. The hub of the wheel is journaled on a sleeve 5 loosely placed on a spindle 6. This spindle has a threaded portion 7 which is screwed onto the hub 8 of a supporting disk 9 which enters the rim 1 of the wheel and lies in close proximity to the web 2 of the carrying wheel, and preferably has secured thereto rings 9' to insure a close joint between the parts to retain grease. Beyond the threaded portion the spindle is reduced and receives a sleeve portion 10 on the lower end of a handle 11, this sleeve portion being clamped to position by the screw 12, threaded in the end of the spindle, and washer 13.

Slidably mounted between guides 14 which project laterally from the inner side of the disk 9, is a cam follower 15, the central portion of which is enlarged and provided with a slotted opening 15ª to receive the hub of the disk. On one end of the follower is a cam roller 16 which operates in the cam way of the carrying wheel to impart a reciprocating motion to the follower when the machine is operated.

Formed integrally with the disk 9 is a bracket 17 which projects forwardly and has secured to its under side, the hand 18 of a series of three stationary cutter fingers 19, 20 and 21. Pivotally mounted on a stud 22 projecting upwardly from the hand 18 is a bar 23 having two forwardly projecting double-edge cutting blades 24 and 25 to co-operate with the cutter fingers a coil spring 26 being interposed between the plate 23 and the head 22ª of the stud so as to hold the cutting blades yieldably to the fingers, rendering the parts self-sharpening.

Projecting from the center of the cam follower 15 is an arm 27 which has a finger 28 which projects laterally through a slotted opening 29 in the disk 9; this finger 28 being pivotally connected with one end of the bar 23 by a link 30.

Projecting forwardly from the finger 21 is an arm 31, having at its outer end a pin 32 onto which is journaled a small gauge wheel 33 to regulate the height of cut.

In operation, as the machine is pushed forwardly by the handle, the ground wheel revolves and the cam follower 15 will be given a reciprocating motion, which, through the connections described imparts an oscillatory movement to the cutting blades 21, 24 and 25; these blades, as well as the fingers, having their cutting edges converged forwardly so as to readily enter the grass blades and provide for a shearing cut.

By the construction described, it will be seen that a very simple and compact machine is provided which is light in character and narrow as to width so as to enable it to be operated in those places which are inaccessible to the ordinary lawn mower. By reason of that arrangement by which the supporting disk 9 is fitted to the interior of the rim of the carrying wheel, I am enabled to pack the carrying wheel with grease so as to provide lubricant for the cams and cam wheel, follower and bearings, and the construction described is also one which provides a very simple manner of converting the rotating motion of the carrying wheel into an oscillatory movement of the cutting blades. By reason of the gauge wheel the height of cut may be regulated without any manipulation on the part of the operator.

Having thus described my invention, I claim:—

1. In a machine of the character described, a ground wheel having a plurality of cams on the interior thereof, a support enclosing one side of said wheel, a bearing on said support for said wheel, a cam follower carried by said support co-operating with the cams of said wheel to impart a reciprocating movement to said follower, stationary and oscillating cutting members carried by said support, and a connection between said follower and said oscillating cutting members.

2. In a machine of the character described, a ground wheel having a central web provided with a plurality of circumferentially arranged cams, a supporting disk fitted to the interior of the rim of said wheel, said wheel having a rotatable connection with said disk, a reciprocal member carried by said disk co-operating with said cams, stationary and oscillatory cutting members carried by said disk, and a connection between said reciprocal member and said oscillatory cutting member.

3. In a machine of the character described, a ground wheel having an outer rim, a hub and a web connecting the rim and hub and closing one side of the wheel, a disk fitted to and closing the other side of the wheel, a plurality of circumferentially arranged cams on the wheel, a cam follower carried by the disk co-operating with the cams, said follower having a laterally-extending finger projecting through a slotted opening in the disk, an oscillatory cutting member supported from the disk, and a connection between said member and said finger.

4. In a machine of the character described, a support, a ground wheel journaled on said support, a circumferentially extending cam-way formed on the interior of said wheel having a plurality of cam surfaces, a follower slidably mounted on said support and having a single cam roller at one end thereof located in said cam-way whereby said follower will be given a reciprocating movement as the ground wheel revolves, an oscillatory cutting member carried by said support, and a connection from said follower to said member to impart oscillatory movement thereto.

5. In a machine of the character described, a support, a ground wheel rotatably mounted on said support, a circumferentially extending cam-way on the interior of said wheel having a plurality of cam surfaces, guide-ways on said support, a follower mounted in said guide-ways for reciprocating movement, said follower having a single cam roller located in said cam-way, an oscillatory cutting member carried in said support, and a connection from said follower to said member to impart oscillatory movement thereto, as the ground wheel revolves.

In testimony whereof, I have hereunto set my hand this 20th day of August, 1921.

OSCAR J. HEIMANN.